United States Patent
Arora et al.

(10) Patent No.: US 12,399,942 B2
(45) Date of Patent: *Aug. 26, 2025

(54) HYBRID METAVERSE USING EDGE NODES TO SUPPORT A SOFT REPOSITORY FOR EVENT PROCESSING

(71) Applicant: Bank of America Corporation, Charlotte, NC (US)

(72) Inventors: Saurabh Arora, Gurugram (IN); Sandeep Chauhan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/612,308

(22) Filed: Mar. 21, 2024

(65) Prior Publication Data

US 2024/0232269 A1   Jul. 11, 2024

Related U.S. Application Data

(63) Continuation of application No. 17/890,514, filed on Aug. 18, 2022, now Pat. No. 11,971,930.

(51) Int. Cl.
   *G06F 16/93* (2019.01)
   *G06F 16/51* (2019.01)
   *G06F 16/535* (2019.01)

(52) U.S. Cl.
   CPC .............. *G06F 16/93* (2019.01); *G06F 16/51* (2019.01); *G06F 16/535* (2019.01)

(58) Field of Classification Search
   None
   See application file for complete search history.

(56) References Cited

U.S. PATENT DOCUMENTS

| | | |
|---|---|---|
| 7,703,667 B2 | 4/2010 | Koorland et al. |
| 7,775,885 B2 | 8/2010 | Van Luchene et al. |
| 8,113,959 B2 | 2/2012 | de Judicibus |
| 8,230,045 B2 | 7/2012 | Kawachiya et al. |
| 8,608,536 B2 | 12/2013 | Van Luchene et al. |
| 8,893,047 B2 | 11/2014 | Cannon et al. |
| 8,990,707 B2 | 3/2015 | Jones et al. |

(Continued)

OTHER PUBLICATIONS

Jan. 26, 2024—(US) Notice of Allowance—U.S. Appl. No. 17/890,514.

*Primary Examiner* — Amresh Singh
(74) *Attorney, Agent, or Firm* — Banner & Witcoff, Ltd.

(57) ABSTRACT

Aspects of the disclosure relate to a hybrid metaverse environment. A computing platform may synchronize, using edge nodes and with a physical repository server, a soft document repository. The computing platform may receive, via a metaverse application interface, an event processing request. The computing platform may identify, based on the event processing request and using a machine learning model, documents needed to execute the event processing request. The computing platform may update a request queue to identify the event processing request and the documents. The computing platform may access, using an edge node and via the soft document repository, the physical repository server to obtain document images corresponding to the identified documents, and may update a response queue to include the obtained document images. The computing platform may send, to an enterprise user device, a haptic alert indicating that the event processing request is ready for processing.

20 Claims, 10 Drawing Sheets

(56) References Cited

U.S. PATENT DOCUMENTS

| | | |
|---|---|---|
| 9,165,426 B2 | 10/2015 | Jones et al. |
| 9,338,200 B2 | 5/2016 | Park et al. |
| 9,480,928 B2 | 11/2016 | Park et al. |
| 9,808,722 B2 | 11/2017 | Kawachiya et al. |
| 9,875,580 B2 | 1/2018 | Cannon et al. |
| 10,326,667 B2 | 6/2019 | Jones et al. |
| 10,437,563 B1 | 10/2019 | Mckinney et al. |
| 10,981,069 B2 | 4/2021 | Kawachiya et al. |
| 11,158,126 B1 | 10/2021 | Petrov et al. |
| 11,290,688 B1 | 3/2022 | Krol et al. |
| 11,294,701 B2 | 4/2022 | Viswanathan et al. |
| 11,325,037 B2 | 5/2022 | Swann et al. |
| 11,357,581 B2 | 6/2022 | Mozes et al. |
| 11,372,680 B2 | 6/2022 | Magro et al. |
| 2011/0231433 A1 | 9/2011 | Tabata et al. |
| 2023/0316263 A1 | 10/2023 | Eby et al. |

405

Request Selection Interface

Please select one of the options below:

1) Change address
2) Change PIN number
3) Withdrawal
4) Transfer funds

Confirmation Interface

The requested event has been processed.

FIG. 5

HYBRID METAVERSE USING EDGE NODES TO SUPPORT A SOFT REPOSITORY FOR EVENT PROCESSING

CROSS-REFERENCE TO RELATED APPLICATION

This application is a continuation of U.S. Ser. No. 17/890,514 filed on Aug. 18, 2022, which is entitled "Hybrid Metaverse Using Edge Nodes to Support a Soft Repository for Event Processing" which is incorporated by reference herein in its entirety.

BACKGROUND

In some instances, individuals may make requests over the phone (e.g., with contact centers, or the like), such as to change an address or to update other information. In some instances, however, such requests might not be fulfilled unless certain documentation is provided (e.g., to verify a user's identity). It may be difficult, in some instances (such as virtual interactions between individuals communicating in a virtual environment such as a metaverse environment), to convey to the individuals exactly what documentation is needed for a specific request. This may result in delayed and/or incorrect request processing. Accordingly, it may be important to provide an improved method for requesting and providing requested specific documentation.

SUMMARY

Aspects of the disclosure provide effective, efficient, scalable, and convenient technical solutions that address and overcome the technical problems associated with event processing in a metaverse environment. In accordance with one or more embodiments of the disclosure, a computing platform comprising at least one processor, a communication interface, and memory storing computer-readable instructions may synchronize, using one or more edge nodes of the computing platform and with a physical repository server, a soft document repository, where the physical repository server stores document images, and the soft document repository stores links to the document images. The computing platform may receive, from a digital identity within a metaverse environment hosted by the computing platform and using a metaverse application interface, an event processing request. The computing platform may identify, based on the event processing request and using a machine learning model, one or more documents needed to execute the event processing request. The computing platform may update a request queue to include the event processing request and an indication of the identified one or more documents. The computing platform may access, using an edge node of the one or more edge nodes and via the soft repository, the physical repository server to obtain document images corresponding to the identified one or more documents, where the edge node is closer in proximity to a user corresponding to the digital identity than the remaining one or more edge nodes. The computing platform may update a response queue to include the obtained document images. The computing platform may send, to an enterprise user device, a haptic alert indicating that the event processing request is ready for processing and one or more commands directing the enterprise user device to produce a haptic response based on the haptic alert, which may cause the enterprise user device to produce the haptic response.

In one or more instances, the computing platform may be configured to create the digital identity based on registration information received from the user. In one or more instances, creating the digital identity may include creating, at a first node of the one or more edge nodes, the digital identity, and the digital identity may be granted access to the soft document repository via at least one other node of the one or more edge nodes, different than the first node.

In one or more examples, the metaverse application interface may include an interactive touch surface within the metaverse environment. In one or more examples, the computing platform may train, using historical event processing requests and corresponding documentation information, the machine learning model, which may configure the machine learning model to output the one or more documents needed to execute the event processing request.

In one or more instances, the haptic alert may be a notification that the identified one or more documents are available from a system of record. In one or more instances, the one or more documents may be sent from the physical repository server to the system of record based on one or more commands from the computing platform directing the physical repository server to transfer the one or more documents to the system of record.

In one or more examples, the computing platform may automatically process the requested event based on verification of the obtained document images, which may include sending one or more event processing commands to an event processing system directing the event processing system to process the requested event, which may cause the event processing system to process the requested event. In one or more examples, the computing platform may display, via the metaverse application interface, a list of the identified one or more documents. The computing platform may receive, via the metaverse application interface, from the digital identity, and based on user input, a selection of the identified one or more documents, which may cause the computing platform to update the response queue to include the obtained document images.

In one or more instances, the event processing request may be received while a secure session is established between the computing platform and a user device of the user. A user identifier may be assigned to the digital identity and a session identifier may be assigned for the secure session. Sending the haptic alert may be based on verification of the user identifier and the session identifier.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4 and 5 depict illustrative graphical user interfaces for a hybrid metaverse using edge nodes to support a soft document repository in accordance with one or more example embodiments.

DETAILED DESCRIPTION

Figure 1A:
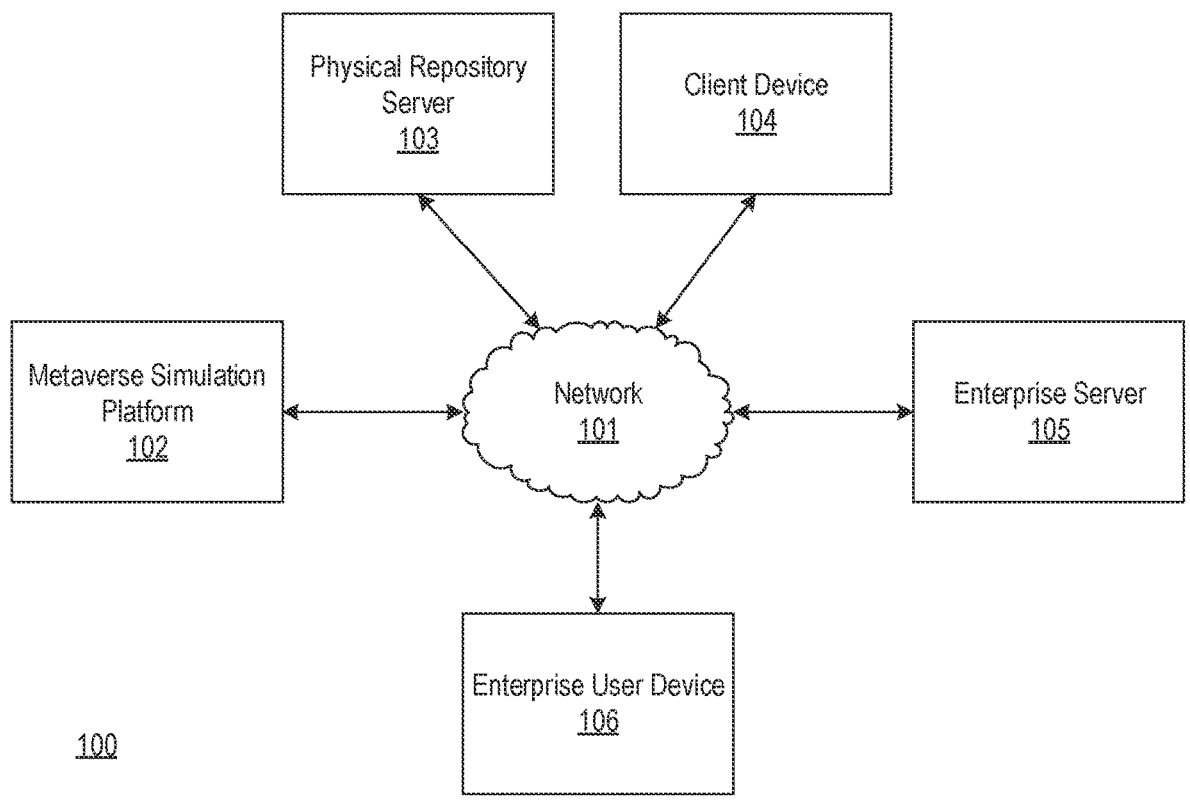
FIGS. 1A-1B depict an illustrative computing environment for a hybrid metaverse using edge nodes to support a soft document repository in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure are directed to a hybrid metaverse that uses edge nodes to support a soft document repository for event processing. In some instances, contact center interactions may rely heavily on interactions via phone calls, and there may be scenarios when clients might not be able to understand or visualize the ask from contact center agents, which may lead to incorrect/delayed processing and dual efforts from agents as well as from the customers.

Currently, there is no mechanism for clients to place a request in a virtual setup. The client should be able to interact with the system/contact center agents in the virtual world, and should be able to place requests/respond to documentation requests for various needs (e.g., without a visit to a financial center).

In some examples, when a customer calls a contact center, contact center agents need to inform customers about the process/documentation needed for a corresponding request, and there may be dependency on agents to receive customer details/documents from separate channels and upload them to a system of record.

Accordingly, described herein is a real-time method for sharing the documentation in a virtual setup where the customer can choose to share the documents from an existing repository with exclusive access. A hybrid setup is described where the customer may respond to documentation requests and share the data in a virtual and physical world at the same time with one single consolidated mechanism without explicitly sharing the documents.

In some arrangements, the system should be able to dynamically seed events from virtual to real banking systems and leverage existing processes to ensure safer processing of client requests.

Accordingly, described herein is a hybrid metaverse for contact center consolidated request processing by real time data transmission. Separate metaverse application instances on edge nodes may maintain a customer's digital identity and a financial institution's identity, and a common node may host a soft repository for data transmission in and out of the metaverse.

A customer and/or enterprise employee may register to get a digital identity, a unique digital identity may be created (e.g., on an edge node hosting metaverse application), and a key may be provided to the customer. The digital identity may get access to a soft repository (on a separate edge node) which may hold customer data/documents to be used further.

Using a digital identity, the customer may see an interface with options to place requests for various self-serve options, and the customer's digital identity may select an option to place a request on an interactive touch surface. The system may identify documentation needed to support customer requests, and may place a necessary document list in a system request queue. Identity edge nodes having access to a soft repository may allow the customer to select and send documents mentioned in the request queue. A spatial image of the selected document (from soft repository in the metaverse) may be transferred to the system response queue (against requested documents) and, in real-time, documents may also be transferred to a primary system of record for a financial institution, via an eventual sync with the soft repository. The system response queue may be updated and a notification may be sent to the digital identity of the financial institution. Haptic alerts may be generated for the physical identity of the institution to pull the docs from the system of record and respond to the customer's requests accordingly.

This may enable interaction of a digital identity with a soft link to a cloud repository in the metaverse to provide any necessary documentation, and may provide event aggregation/execution (e.g., via request/processing queues) in a hybrid metaverse. The soft repository in the metaverse may allow an eventual sync with a physical cloud repository. The proposed system may allow dynamic selection of data from the soft repository, and may transmit it to the bank system of record against the registered request. The hybrid metaverse may be used to leverage and ensure proper validation of customer requests and documentation.

Figure 1B:
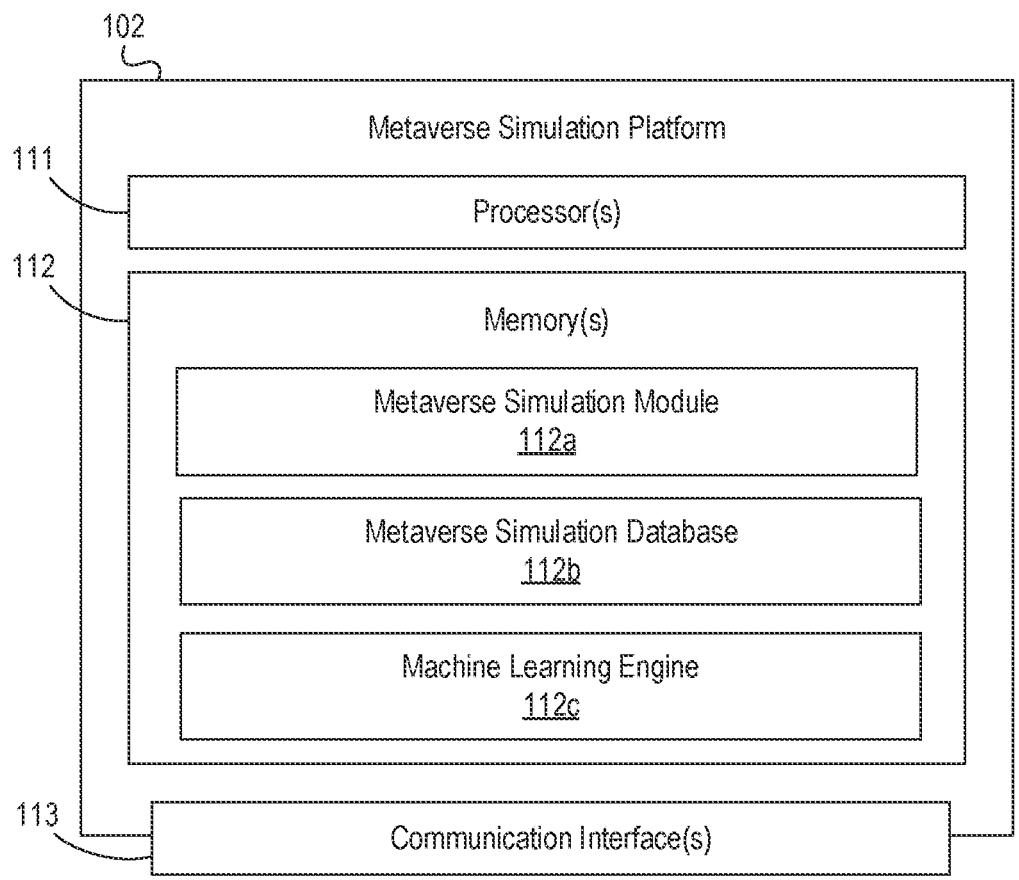

FIGS. 1A-1B depict an illustrative computing environment for a hybrid metaverse using edge nodes to support a soft document repository in accordance with one or more example embodiments. Referring to FIG. 1A, computing environment 100 may include one or more computer systems. For example, computing environment 100 may include a metaverse simulation platform 102, physical repository server 103, client device 104, enterprise server 105, and an enterprise user device 106.

As described further below, metaverse simulation platform 102 may be a computer system that includes one or more computing devices (e.g., servers, server blades, or the like) and/or other computer components (e.g., processors, memories, communication interfaces) that may be configured to support a hybrid metaverse. For example, the metaverse simulation platform 102 may be configured with a plurality of edge nodes, which may e.g., be configured to support a soft repository of documents (e.g., client identification documents, or the like). In some instances, the metaverse simulation platform 102 may be configured to support interactions between digital identities of multiple individuals (e.g., clients and/or employees of a financial institution, or the like). In some instances, the metaverse simulation platform 102 may be configured to train, host, and/or otherwise maintain a machine learning model configured to identify documents needed to approve various requested events. In addition, the metaverse simulation platform 102 may be configured to host a request queue (e.g., of requested events) and a response queue (e.g., indicating documentation obtained for the requests).

Physical repository server 103 may include one or more computing devices (e.g., servers, server blades, or the like) and/or other computer components (e.g., processors, memories, communication interfaces) that may be used to store documents corresponding to various individuals (e.g., clients of a financial institution), which may be used to approve an event processing request. For example, the physical repository server 103 may be configured to store images and/or physical versions of documents such as a driver's license, social security card, proof of signature, passport, birth certificate, and/or other documents.

Client device 104 may be a laptop computer, desktop computer, mobile device, tablet, smartphone, or the like that may be used by customer of an enterprise organization (e.g., a financial institution, or the like). For example, the client device 104 may be used by one or more individuals to configure a digital identity in the metaverse, and to interact within the metaverse accordingly (e.g., to request event processing, and/or otherwise). In some instances, the client device 104 may be configured to display one or more graphical user interfaces (e.g., metaverse interfaces, or the like).

Enterprise server 105 may include one or more computing devices (e.g., servers, server blades, or the like) and/or other computer components (e.g., processors, memories, communication interfaces) that may be used to execute events and/or otherwise operate on behalf of an enterprise organization (e.g., a financial institution). In some instances, the enterprise server 105 may be configured to communicate with the physical repository server 103 to obtain copies or original versions of documentation on behalf of a particular individual so as to approve an event processing request. In some instances, the enterprise server 105 may be a system of record (SOR) for the enterprise organization.

Enterprise user device 106 may be a laptop computer, desktop computer, mobile device, tablet, smartphone, or the like that may be used by an employee of an enterprise organization (e.g., a financial institution, or the like). For example, the enterprise user device 106 may be used by one or more individuals to conduct digital interactions in the metaverse, and to process events accordingly. In some instances, the enterprise user device 106 may be configured to display one or more graphical user interfaces (e.g., metaverse interfaces, or the like). Computing environment 100 also may include one or more networks, which may interconnect metaverse simulation platform 102, physical repository server 103, client device 104, enterprise server 105, and/or enterprise user device 106. For example, computing environment 100 may include a network 101 (which may e.g., interconnect metaverse simulation platform 102, physical repository server 103, client device 104, enterprise server 105, and/or enterprise user device 106).

In one or more arrangements, metaverse simulation platform 102, physical repository server 103, client device 104, enterprise server 105, and/or enterprise user device 106 may be any type of computing device capable of sending and/or receiving requests and processing the requests accordingly. For example, metaverse simulation platform 102, physical repository server 103, client device 104, enterprise server 105, enterprise user device 106 and/or the other systems included in computing environment 100 may in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of metaverse simulation platform 102, physical repository server 103, client device 104, enterprise server 105, and/or enterprise user device 106, may in some instances, be special-purpose computing devices configured to perform specific functions.

Referring to FIG. 1B, metaverse simulation platform 102 may include one or more processors 111, memory 112, and communication interface 113. A data bus may interconnect processor 111, memory 112, and communication interface 113. Communication interface 113 may be a network interface configured to support communication between metaverse simulation platform 102 and one or more networks (e.g., network 101, or the like). Memory 112 may include one or more program modules having instructions that when executed by processor 111 cause metaverse simulation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of metaverse simulation platform 102 and/or by different computing devices that may form and/or otherwise make up metaverse simulation platform 102. For example, memory 112 may have, host, store, and/or include metaverse simulation module 112a, metaverse simulation database 112b, and machine learning engine 112c.

Metaverse simulation module 112a may have instructions that direct and/or cause metaverse simulation platform 102 to execute advanced event processing techniques. Metaverse simulation database 112b may store information used by metaverse simulation module 112a and/or metaverse simulation platform 102 in application of advanced event processing techniques, and/or in performing other functions. Machine learning engine 112c may have instructions that direct and/or cause the metaverse simulation platform 102 to set, define, and/or iteratively refine optimization rules and/or other parameters used by the metaverse simulation platform 102 and/or other systems in computing environment 100.

Figure 2A:
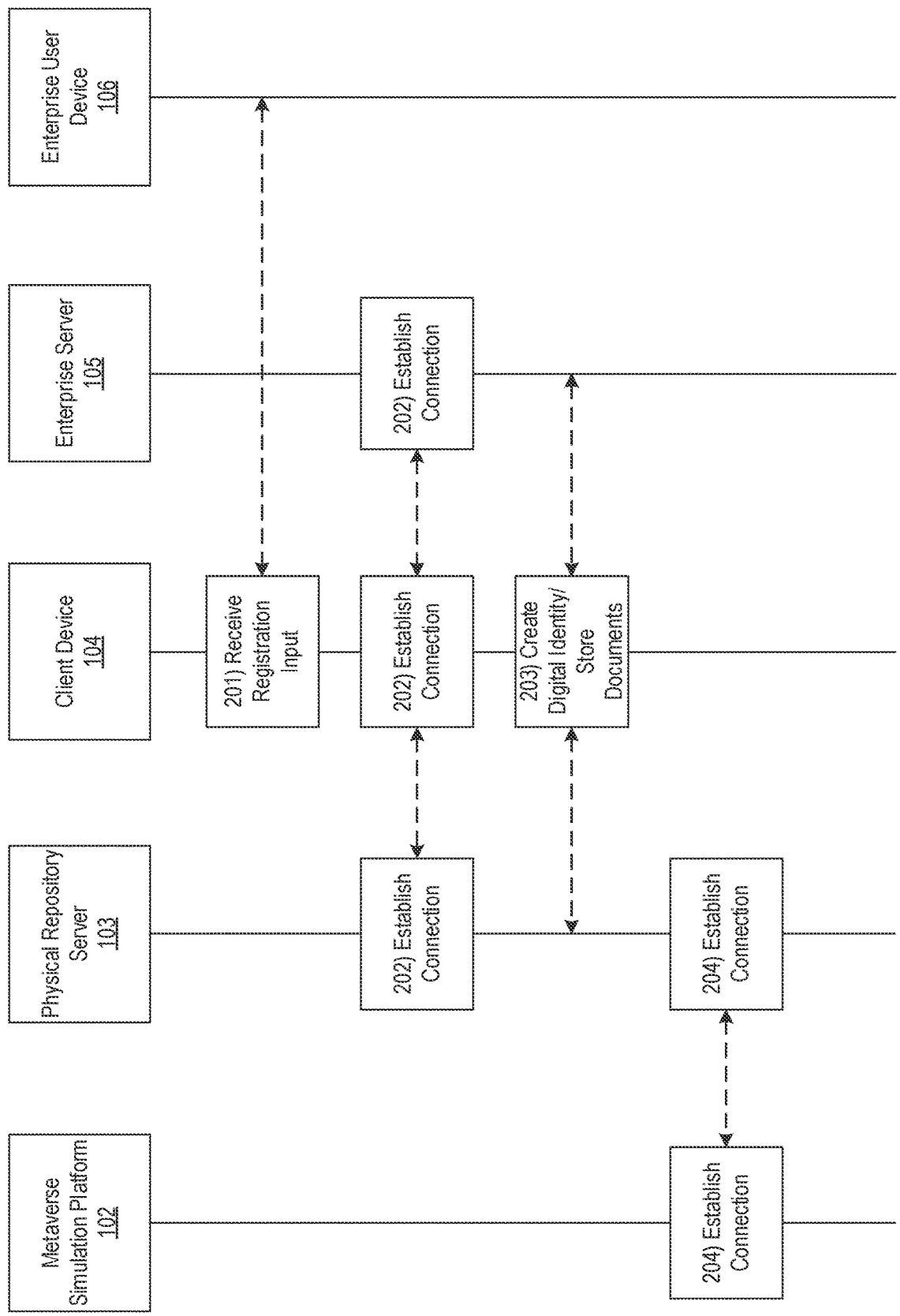
FIGS. 2A-2F depict an illustrative event sequence for a hybrid metaverse using edge nodes to support a soft document repository in accordance with one or more example embodiments.

FIGS. 2A-2F depict an illustrative event sequence for a hybrid metaverse using edge nodes to support a soft document repository in accordance with one or more example embodiments. Referring to FIG. 2A, at step 201, the client device 104 may receive a registration input from a user. For example, the client device 104 may receive a registration input via an interface of the client device 104, causing the client device 104 to register the user for purposes of event processing via a hybrid metaverse. In some instances, in receiving the registration input, the client device 104 may receive (e.g., scan, take a picture, and/or otherwise capture) images of documents for the user (e.g., driver's license, passport, social security card, birth certificate, proof of signature, and/or other documents). In some instances, the client device 104 may also receive account information, and/or other information for the user.

At step 202, client device 104 may establish connections with the physical repository server 103 and/or enterprise server 105. For example, the client device 104 may establish first and/or second wireless data connections with the physical repository server 103 and/or enterprise server 105 (e.g., to link the client device 104 to the physical repository server 103 and/or enterprise server 105). In some instances, the client device 104 may identify whether connections are already established with the physical repository server 103 and/or enterprise server 105. If connections are already established with the physical repository server 103 and/or enterprise server 105, the client device 104 might not re-establish the connections. If connections are not yet established with the physical repository server 103 and/or enterprise server 105, the client device 104 may establish the first and/or second wireless data connections as described herein.

At step 203, the client device 104 may create, using the registration information, a digital identity for the user. For example, the client device 104 may create a digital identity that may be used by the user to interact within the metaverse. In some instances, creation of the digital identity may involve communication between the client device 104 and the metaverse simulation platform 102. In these instances, the digital identity may be created based on communication between the client device 104 and one or more edge nodes of the metaverse simulation platform 102. In these instances, the digital identity may be granted access to a soft document repository (which is described further below) via a different edge node of the one or more edge nodes. In some instances, the client device 104 may cause information of the digital identity to be stored at the enterprise server 105.

As part of creating the digital identity, the client device 104 may cause the documents for the user to be stored at the physical repository server 103. For example, the client device 104 may send images of the documents (along with one or more commands to store the document images). Additionally or alternatively, the client device 104 may prompt the user to otherwise provide the documents to the physical repository server 103 (e.g., by displaying a graphical user interface prompting the user to do so).

At step 204, the metaverse simulation platform 102 may establish a connection with the physical repository server 103. For example, the metaverse simulation platform 102 may establish a third wireless data connection with the physical repository server 103 to link the metaverse simulation platform 102 with the physical repository server 103 (e.g., in preparation for synchronizing a soft document repository, maintained by one or more nodes of the metaverse simulation platform 102, with the physical repository server 103). In some instances, the metaverse simulation platform 102 may identify whether or not a connection is already established with the physical repository server 103. If a connection is already established with the physical repository server 103, the metaverse simulation platform 102 might not re-establish the connection. If a connection is not yet established with the physical repository server 103, the metaverse simulation platform 102 may establish the third wireless data connection as described herein.

Figure 2B:
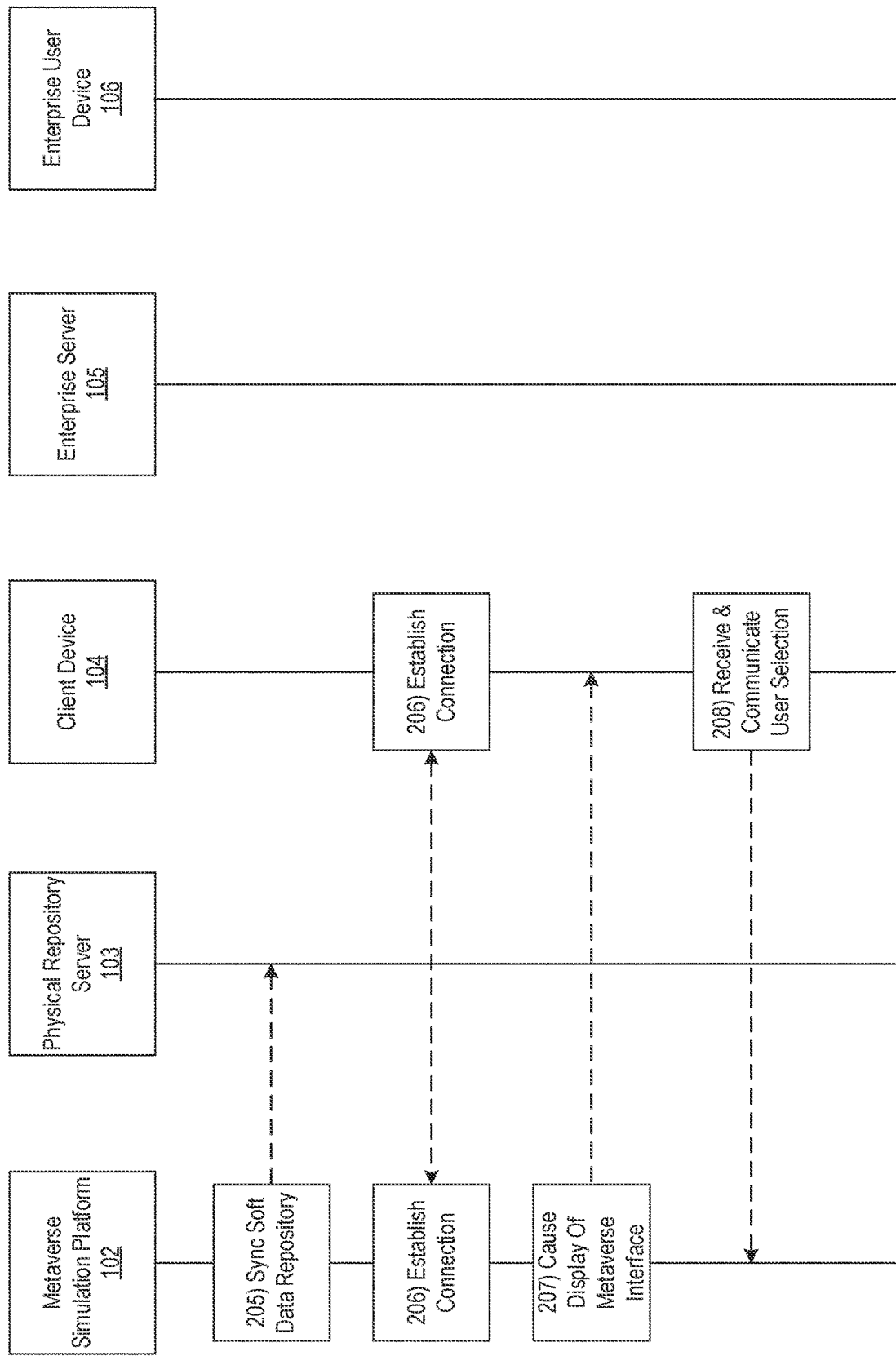

Referring to FIG. 2B, at step 205, the metaverse simulation platform 102 may synchronize the soft data repository with the physical repository server 103. For example, the metaverse simulation platform 102 may synchronize the soft data repository across one or more nodes of the metaverse simulation platform 102. In some instances, in doing so, the metaverse simulation platform 102 may synchronize the soft data repository to include, for each of the documents uploaded by the user, a link or other information corresponding to the documents. In some instances, the metaverse simulation platform 102 may synchronize the soft data repository using a node of the metaverse simulation platform 102 located in closest geographic or physical proximity to the user, the physical repository server 103, the client device 104, and/or other systems (e.g., when compared to the remaining nodes). Additionally or alternatively, the metaverse simulation platform 102 may synchronize the soft data repository using a node of the metaverse simulation platform 102 with the most available processing power, memory, and/or other features. In some instances, the metaverse simulation platform 102 may subsequently synchronize the soft data repository across one or more additional nodes of the metaverse simulation platform 102.

In doing so, the metaverse simulation platform 102 may conserve memory and/or other processing resources by avoiding physical storage of the documents in the soft document repository, and instead storing merely links to the documents, information of the documents, a list of documents, and/or other information. This may be especially important in the metaverse context, as the metaverse itself may consume significant processing resources and/or memory, and thus the addition of significantly more data may resource in processing delays. Similarly, by using the most proximate node to perform the synchronization, the metaverse simulation platform 102 may further reduce processing times.

At step 206, metaverse simulation platform 102 may establish a connection with the client device 104. For example, the metaverse simulation platform 102 may establish a fourth wireless data connection with the client device 104 to link the metaverse simulation platform 102 with the client device 104 (e.g., in preparation for causing display of one or more metaverse interfaces). In some instances, the metaverse simulation platform 102 may identify whether a connection is already established with the client device 104. If a connection is already established with the client device 104, the metaverse simulation platform 102 might not re-establish the connection. Otherwise, if a connection is not yet established with the client device 104, the metaverse simulation platform 102 may establish the fourth wireless data connection as described herein.

At step 207, the metaverse simulation platform 102 may communicate with the client device 104 to display a metaverse interface. For example, the metaverse simulation platform 102 may display an interface that may allow the digital identity, created for the user, to interact with the metaverse (e.g., to request events to be processed, and/or otherwise), via an interactive touch surface within the metaverse environment. For example, the metaverse simulation platform 102 may cause a metaverse application interface to be displayed to the digital identity, which may include a variety of events that may be selected for processing. For example, the metaverse simulation platform 102 and/or the client device 104 may display a graphical user interface similar to metaverse application interface 405, which is shown in FIG. 4.

In some instances, this step may entail establishing a secure session between the metaverse simulation platform 102 and the client device 104, which may e.g., remain established throughout the duration of the proceeding event sequence. In these instances, establishing the secure session may include verifying a user identifier or other credentials (which may e.g., have been assigned to the digital identity upon registration/creation) corresponding to the digital identity. Additionally or alternatively, the metaverse simulation platform 102 may assign a session identifier upon establishing the secure session.

At step 208, the client device 104 may communicate with the metaverse simulation platform 102 to enable, receive, send, and/or otherwise communicate the selection of a requested event (e.g., selected by the digital identity within the metaverse environment). In these instances, selection of the requested event (e.g., via the metaverse application interface 405) may cause the metaverse simulation platform 102 to add the requested event to a request queue, as described further below.

Figure 2C:
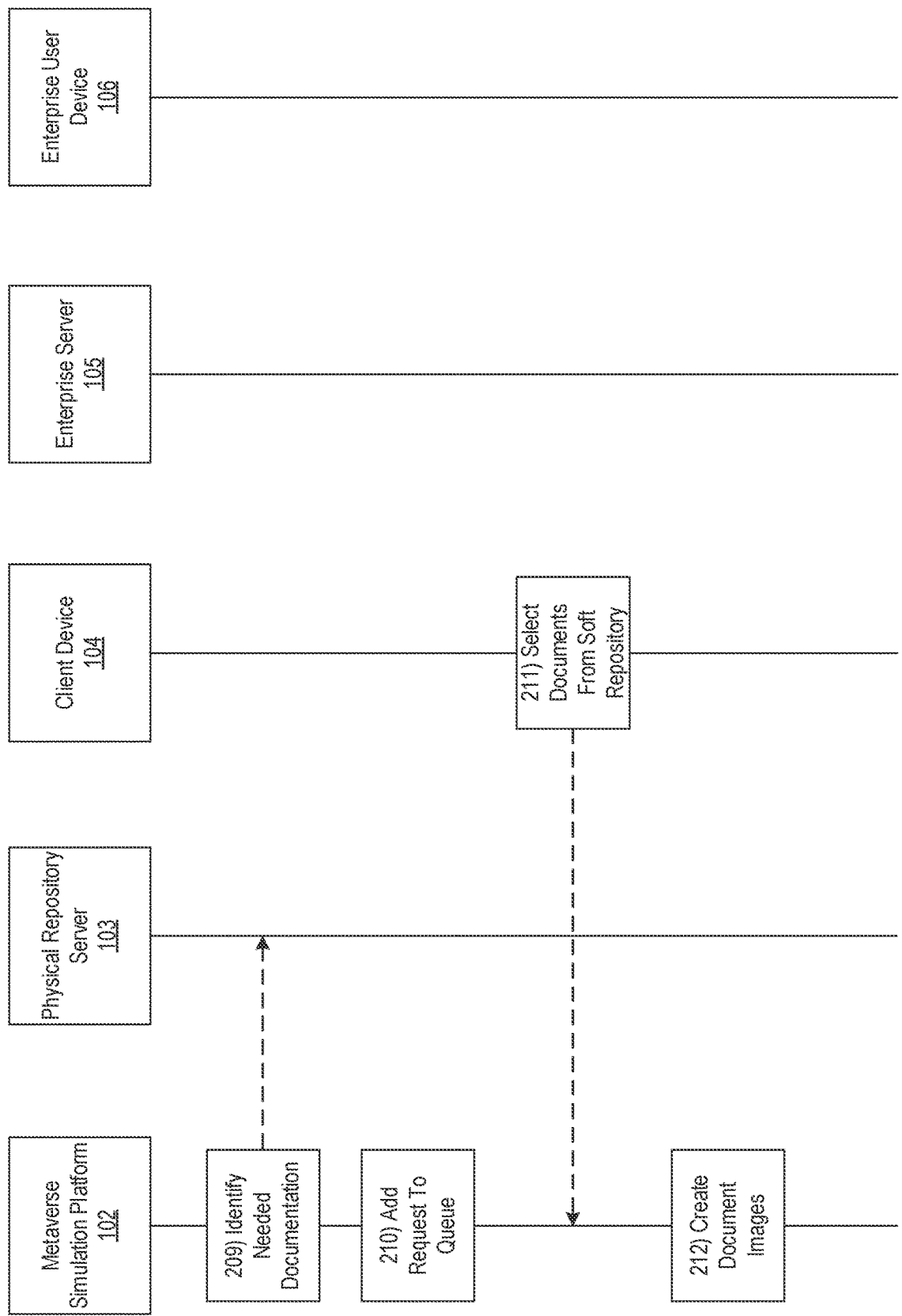

Referring to FIG. 2C, at step 209, the metaverse simulation platform 102 may identify one or more documents needed to execute and/or otherwise process the requested event. To do so, the metaverse simulation platform 102 may in some instances, input the requested event into a machine learning model, which may be configured to output a list of necessary documents.

For example, the metaverse simulation platform 102 may initially train the machine learning model using one or more supervised learning techniques (e.g., decision tree, bagging, boosting, random forest, linear regression, artificial neural networks, logistic regression, support vector machines, and/or other supervised learning techniques). For example, the metaverse simulation platform 102 may input labelled event processing information into the model, which may e.g., include various historical event data indicating previously processed event requests (e.g., profile update requests, balance inquiries, transfer requests, account creation requests, and/or other requests), which may be labelled with a listing of the corresponding documents needed to process the corresponding requests, user information (e.g., account information, demographic information, and/or other information), event information (e.g., transaction amount, account information, and/or other information), and/or other information. In these instances, the labelled data may be fed into the machine learning model so as to train the machine learning model to output a list of needed documents based on the input of a requested event.

Once initially trained, the metaverse simulation platform 102 may dynamically and continuously train, maintain, and/or otherwise refine the machine learning model by feeding newly received event processing requests, the corresponding lists of documents output by the machine learning model, and any feedback received based on the lists of documents. For example, if feedback is received indicating that the corresponding documents should be updated or otherwise changed (e.g., to increase a level of security, decrease a level of security, and/or otherwise) to include more or fewer documents, the metaverse simulation platform 102 may update the corresponding list of documents accordingly. In these instances, the machine learning model may continuously learn from this feedback so as to adjust the corresponding lists of needed documents for various events accordingly. Similarly, the machine learning model may continue to update based on new event types, new user information, and/or otherwise, so as to dynamically train itself to adapt to new events and/or users.

In some instances, the machine learning model may be trained to distinguish between events that may be automatically processed, and those that may only be processed through manual review. In some instances, the machine learning model may further distinguish these types of events based on user information, transaction information, document types needed for the event, and/or otherwise (e.g., a particular event may be automatically processed for a first user, a first transaction amount, document type, or the like, but not for a second user, other transaction amount, other document type, or the like etc.).

Accordingly, the metaverse simulation platform 102 may input the event processing request into the machine learning model, which may output a list of needed documents to process the request. In some instances, the metaverse simulation platform 102 may also output whether or not the event processing request may be automatically processed, or rather if manual review is needed.

At step 210, once the list of documents has been identified at step 209, the metaverse simulation platform 102 may update a stored request queue to include the requested event as well as a list of the identified documents needed to process the requested event. In some instances, the request queue may be an overall request queue that includes requests for all digital identities in the metaverse. Additionally or alternatively, smaller request queues may be used for requests on a user, geographical, event type, and/or other basis.

At step 211, the client device 104 may communicate with the metaverse simulation platform 102 to select and/or otherwise provide the documents listed in the request queue for the requested event. For example, the digital identity for the user may access the document list via a metaverse application interface (e.g., an interactive touch surface within the metaverse environment), which may allow the digital identity to see what documents are needed, and to provide them accordingly. For example, the digital identity may be able to select documents, stored by the corresponding user during registration, by accessing the links or other information in the soft document repository. In these instances, the metaverse simulation platform 102 may similarly use an edge node closest to the user in geographic proximity, with highest availability or processing capacity, closest to the physical repository server, and/or otherwise to access the soft document repository.

At step 212, the metaverse simulation platform 102 may use the edge node, identified above at step 211, to access the soft document repository, which may be linked to the physical repository server 103, and may generate or otherwise obtain images and/or information of the accessed documents accordingly (e.g., images of the documents in the list output by the machine learning model).

Figure 2D:
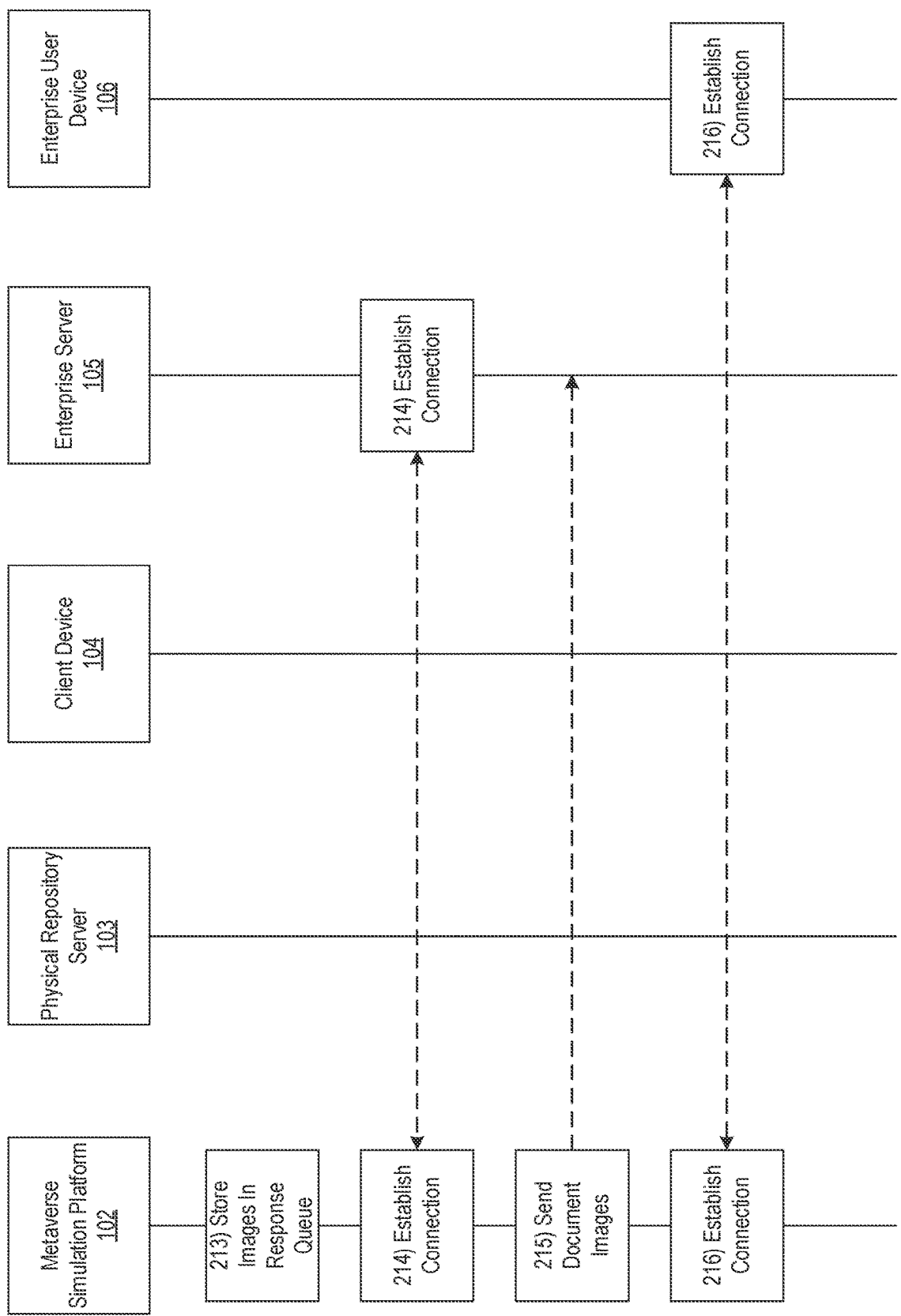

Referring to FIG. 2D, at step 213, based on or in response to the selection received at step 211, the metaverse simulation platform 102 may update a response queue to include any identified document images/information. For example, the metaverse simulation platform 102 may maintain a response queue that indicates the user identity and/or requested event, along with any documentation that has been obtained or is still outstanding.

At step 214, the metaverse simulation platform 102 may establish a connection with the enterprise server 105. For example, the metaverse simulation platform 102 may establish a fifth wireless data connection with the enterprise server 105 to link the metaverse simulation platform 102 with the enterprise server 105 (e.g., in preparation for providing document images and/or information). In some instances, the metaverse simulation platform 102 may identify whether or not a connection is already established with the enterprise server 105. If a connection is already established with the enterprise server 105, the metaverse simulation platform 102 might not re-establish the connection. If a connection is not yet established between the metaverse simulation platform 102 and the enterprise server 105, the metaverse simulation platform 102 may establish the fifth wireless data connection as described herein.

At step 215, the metaverse simulation platform 102 may send, share, or otherwise provide the document images and/or information to the enterprise server 105. In some instances, in sending the document images and/or information, the metaverse simulation platform 102 may send one or more commands directing the physical repository server 103 to provide the documents to the enterprise server 105, which may e.g., cause the physical repository server 103 to provide the documents, document images, document information, and/or other information.

In some instances, the metaverse simulation platform 102 may send (or cause sending of) the document images and/or information only after identifying that all necessary documents have been obtained.

At step 216, the metaverse simulation platform 102 may establish a connection with the enterprise user device 106.

For example, the metaverse simulation platform 102 may establish a sixth wireless data connection with the enterprise user device 106 to link the metaverse simulation platform 102 with the enterprise user device 106 (e.g., in preparation for sending haptic alerts). In some instances, the metaverse simulation platform 102 may identify whether a connection is already established with the enterprise user device 106. If a connection is already established with the enterprise user device 106, the metaverse simulation platform 102 might not re-establish the connection. If a connection is not yet established with the enterprise user device 106, the metaverse simulation platform 102 may establish the sixth wireless data connection as described herein.

Figure 2E:
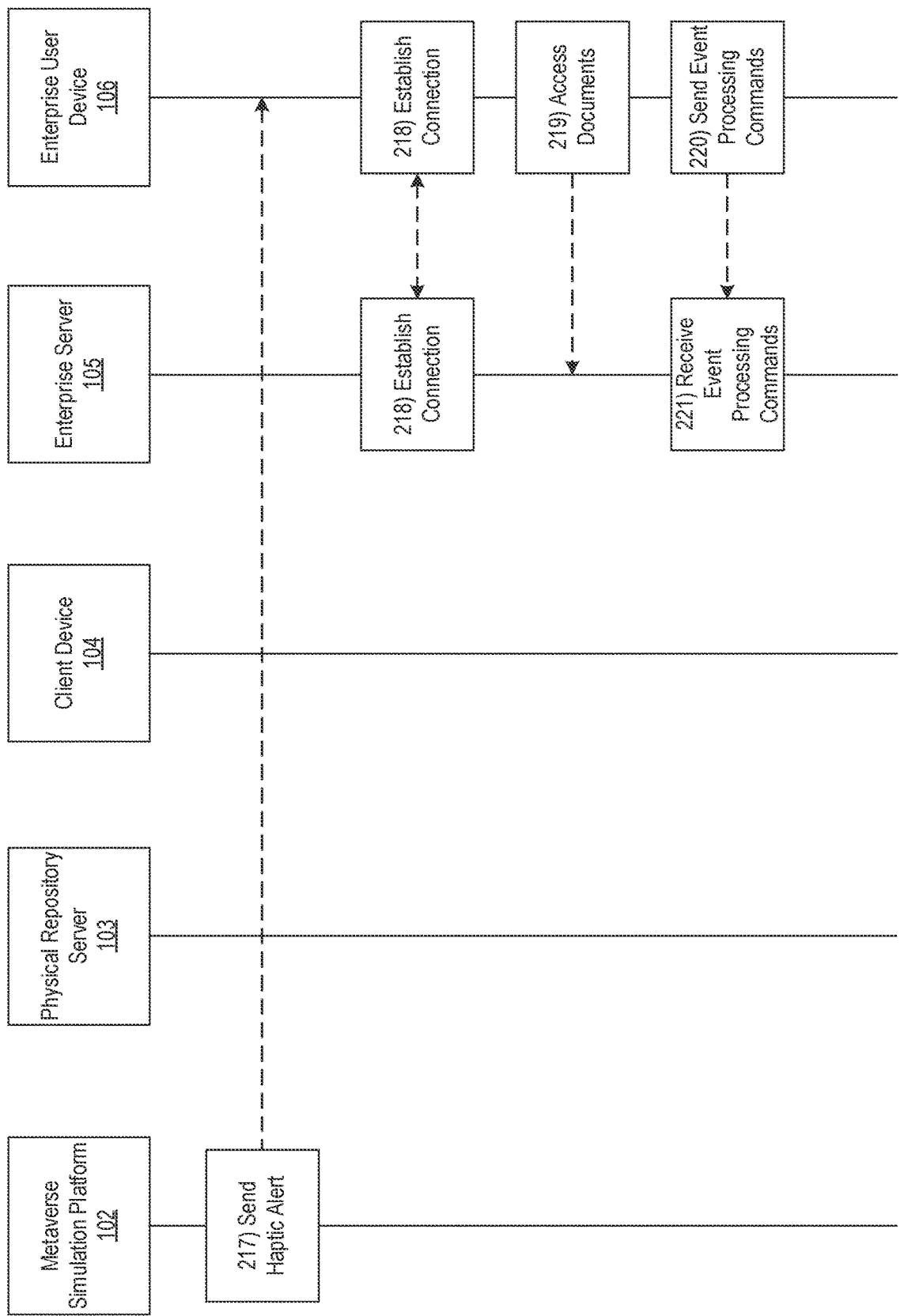

Referring to FIG. 2E, at step 217, the metaverse simulation platform 102 may send a haptic alert to the enterprise user device 106. In some instances, the metaverse simulation platform 102 may also send one or more commands directing the enterprise user device 106 to produce a haptic response (which may e.g., include displaying an interface or notification, producing a vibration alert, producing a sound alert, producing a light alert, and/or other haptic alert). In some instances, the metaverse simulation platform may send the haptic alert to the enterprise user device 106 via the communication interface 113 and while the sixth wireless data connection is established.

Based on or in response to the one or more commands directing the enterprise user device 106 to produce the haptic alert, the enterprise user device 106 may output the haptic alert. In doing so, the enterprise user device 106 may notify an employee of an enterprise organization (e.g., a financial institution) that all documents, necessary to process the event processing request, are available at a system of record (e.g., the enterprise server 105) for the enterprise organization.

In some instances, in addition or as an alternative to outputting the haptic alert at the enterprise user device 106, a user of the enterprise user device 106 may access the haptic alert (and/or other event processing information) using a digital identity for the enterprise user (which may e.g., be similar to the digital identity of the user of the client device 104, as described above).

At step 218, the enterprise user device 106 may establish a connection with the enterprise server 105. For example, the enterprise user device 106 may establish a seventh wireless data connection with the enterprise server 105 to link the enterprise user device 106 to the enterprise server 105 (e.g., in preparation for accessing documents). In some instances, the enterprise user device 106 may identify whether a connection is already established with the enterprise server 105. If a connection is already established with the enterprise server 105, the enterprise user device 106 might not re-establish the connection. If a connection is not established with the enterprise server 105, the enterprise user device 106 may establish the seventh wireless data connection as described herein.

At step 219, the enterprise user device 106 may access the documents needed to process the requested event. For example, the enterprise user device 106 may access the documents from the enterprise server 105 while the seventh wireless data connection is established. In these instances, the enterprise user device 106 (and/or an enterprise employee using the enterprise user device 106) may validate the documents. If the documents are valid, the enterprise user device 106 may proceed to step 220. Otherwise, the enterprise user device 106 may notify the client device 104 that the event cannot be processed, requesting updated documentation, and/or executing other actions.

At step 220, based on validation of the documents at step 219, the enterprise user device 106 may send one or more commands directing the enterprise server 105 to process the requested event. For example, the enterprise user device 106 may send the one or more commands directing the enterprise server 105 to process the requested event while the seventh data connection is established.

In some instances, in addition or as an alternative to sending the haptic alert to the enterprise user device 106 and having the enterprise user device 106 direct the enterprise server 105 as described above in steps 216-220, the metaverse simulation platform 102 may automatically cause the event to be processed. For example, the metaverse simulation platform 102 may itself send the one or more commands directing the enterprise server 105 to process the requested event. In some instances, the metaverse simulation platform 102 may identify whether an event may be automatically processed based on the event type (e.g., certain types of events may be automatically processed while others might not), user information (e.g., whether a corresponding balance exceeds a threshold, whether all necessary documentation has been obtained, and/or other information), event information (e.g., whether an amount corresponding to the request exceeds a threshold, or the like), and/or other information.

In either instance, the metaverse simulation platform 102 may communicate or otherwise verify the session identifier and/or client identifier to the enterprise server 105. In some instances, the metaverse simulation platform 102 may only send the haptic alert and/or event processing commands upon verifying the user identifier and/or the session identifier itself.

At step 221, the enterprise server 105 may receive the one or more commands directing the enterprise server 105 to process the requested event. For example, the enterprise server 105 may receive the one or more commands directing the enterprise server 105 to process the requested event while the seventh wireless data connection is established.

Figure 2F:
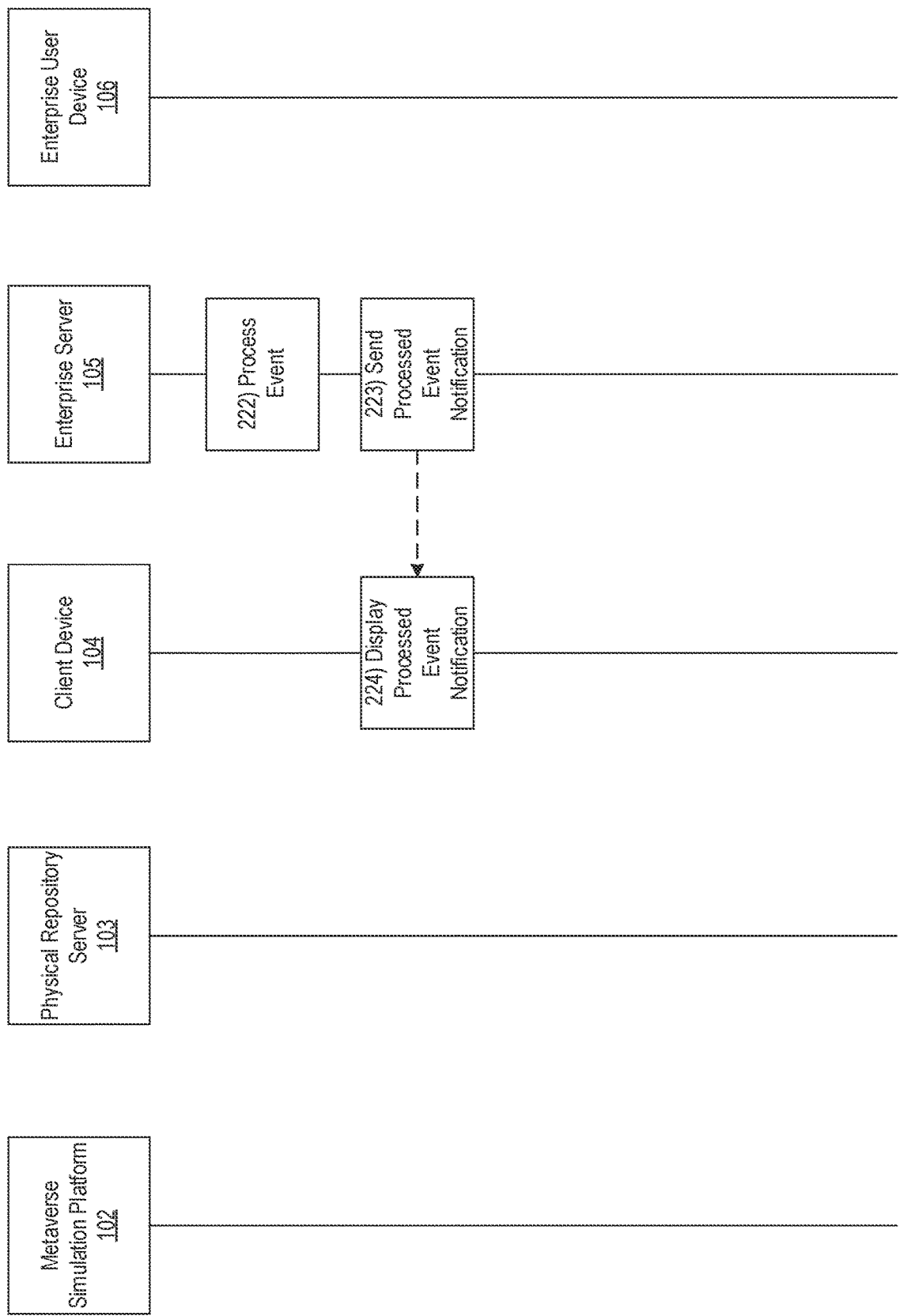

Referring to FIG. 2F, at step 222, based on or in response to the one or more commands directing the enterprise server 105 to process the requested event, and upon validating the user identifier and/or the session identifier, the enterprise server 105 may process the requested event.

At step 223, once the requested event has been processed, the enterprise server 105 may send a notification to the client device 104 indicating that the requested event has been processed. For example, the enterprise server 105 may send the notification to the client device 104 while the second wireless data connection is established.

At step 224, the client device 104 may receive the event processing notification sent at step 223. For example, the client device 104 may receive the event processing notification while the second wireless data connection is established. In some instances, the client device 104 may display a graphical user interface similar to graphical user interface 505, which is shown in FIG. 5.

Although only a single event processing request is described, any number of event processing requests may be received from and processed on behalf of a single or multiple different individuals without departing from the scope of the disclosure.

Figure 3:
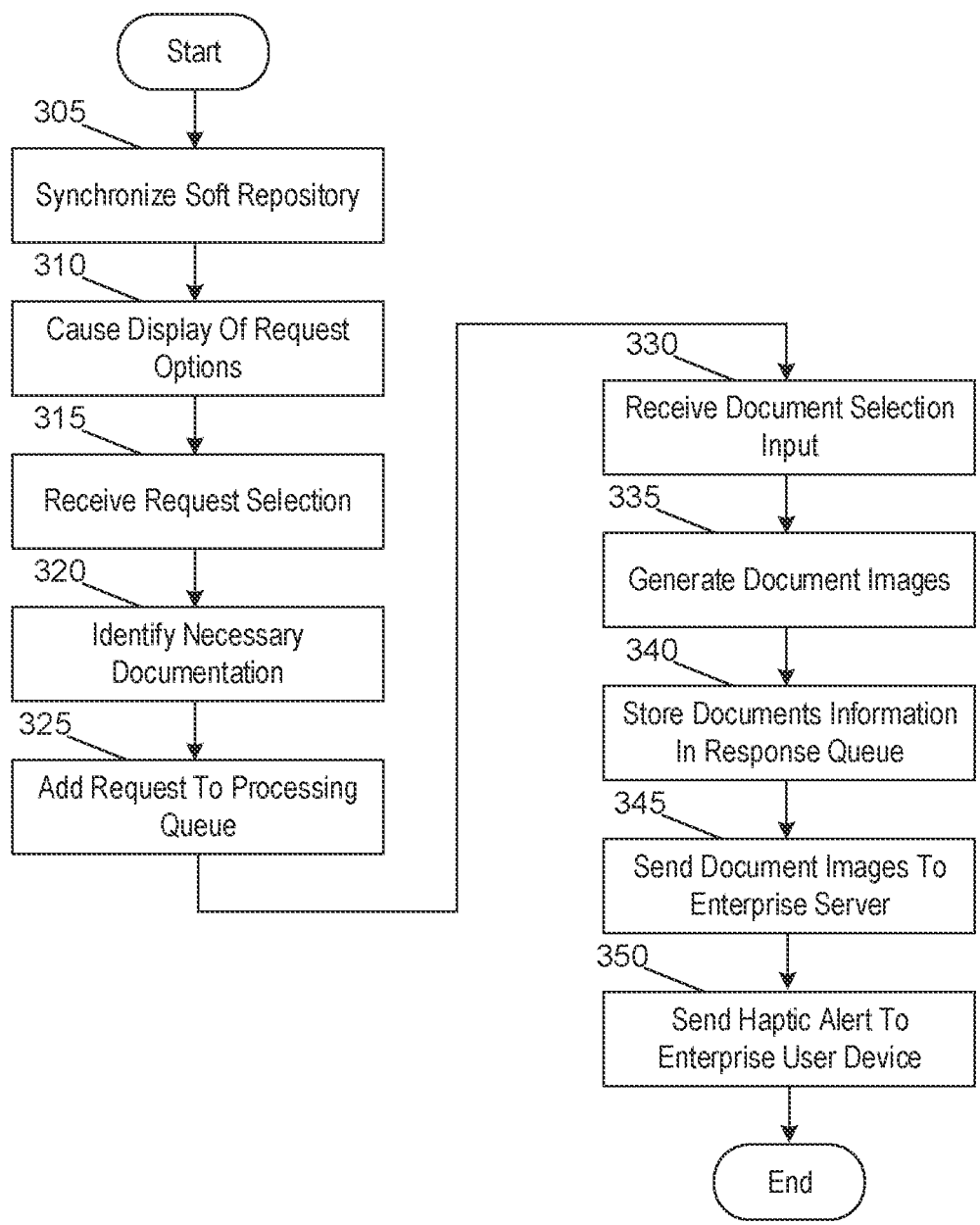
FIG. 3 depicts an illustrative method for a hybrid metaverse using edge nodes to support a soft document repository in accordance with one or more example embodiments.

FIG. 3 depicts an illustrative method for a hybrid metaverse using edge nodes to support a soft document repository in accordance with one or more example embodiments. Referring to FIG. 3, at step 305, a computing platform having at least one processor, a communication interface, and memory may synchronize a soft document repository with a physical document repository. At step 310, the computing platform may cause display, within a metaverse environment, of one or more event processing options. At step 315, the computing platform may receive a selection from the one or more event processing options. At step 320, the computing platform may identify documents needed to process the requested event. At step 325, the computing platform may add the event processing request to a request queue. At step 330, the computing platform may receive a document selection input to retrieve the requested documents for a user corresponding to the event processing request. At step 335, the computing platform may generate images of the selected documents. At step 340, the computing platform may store the images of the selected documents and/or other document information in a response queue. At step 345, the computing platform may send the document images to an enterprise server. At step 350, the computing platform may send a haptic alert to an enterprise user device indicating that the documents are available at the enterprise server.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the processor, cause the computing platform to:
   synchronize, using one or more edge nodes of the computing platform and with a physical repository server, a soft document repository, wherein the physical repository server stores document images, and wherein the soft document repository stores links to the document images;
   identify, based on an event processing request received from a digital identity in a metaverse environment and using a machine learning model, one or more documents needed to execute the event processing request;
   access, using an edge node of the one or more edge nodes and via the soft document repository, the physical repository server to obtain document images corresponding to the identified one or more documents, wherein the edge node is closer in proximity to a user corresponding to the digital identity than the remaining one or more edge nodes; and
   send, to an enterprise user device, a haptic alert indicating that the event processing request is ready for processing and one or more commands directing the enterprise user device to produce a haptic response based on the haptic alert, wherein sending the one or more commands directing the enterprise user device to produce the haptic response cause the enterprise user device to produce the haptic response.

2. The computing platform of claim 1, wherein the computing platform is configured to create the digital identity based on registration information received from the user.

3. The computing platform of claim 1, wherein creating the digital identity comprises creating, at a first node of the one or more edge nodes, the digital identity, and wherein the digital identity is granted access to the soft document repository via at least one other node of the one or more edge nodes, different than the first node.

4. The computing platform of claim 1, wherein the event processing request is received via a metaverse application interface, and wherein the metaverse application interface comprises an interactive touch surface within the metaverse environment.

5. The computing platform of claim 1, wherein the memory stores additional computer-readable instructions that, when executed by the at least one processor, cause the computing platform to:
train, using historical event processing requests and corresponding documentation information, the machine learning model, wherein training the machine learning model configures the machine learning model to output the one or more documents needed to execute the event processing request.

6. The computing platform of claim 1, wherein the haptic alert comprises a notification that the identified one or more documents are available from a system of record.

7. The computing platform of claim 6, wherein the one or more documents are sent from the physical repository server to the system of record based on one or more commands from the computing platform directing the physical repository server to transfer the one or more documents to the system of record.

8. The computing platform of claim 1, wherein the memory stores additional computer-readable instructions that, when executed by the at least one processor, cause the computing platform to:
automatically process the requested event based on verification of the obtained document images, wherein automatically processing the requested event comprises sending one or more event processing commands to an event processing system directing the event processing system to process the requested event, wherein sending the one or more event processing commands to the event processing system causes the event processing system to process the requested event.

9. The computing platform of claim 1, wherein the memory stores additional computer-readable instructions that, when executed by the at least one processor, cause the computing platform to:
display, via a metaverse application interface, a list of the identified one or more documents; and
receive, via the metaverse application interface, from the digital identity, and based on user input, a selection of the identified one or more documents, wherein receiving the selection of the identified one or more documents causes the computing platform to update a response queue to include the obtained document images.

10. The computing platform of claim 1, wherein:
the event processing request is received while a secure session is established between the computing platform and a user device of the user,
a user identifier is assigned to the digital identity,
a session identifier is assigned for the secure session, and
sending the haptic alert is based on verification of the user identifier and the session identifier.

11. The computing platform of claim 1, wherein the memory stores additional computer-readable instructions that, when executed by the at least one processor, cause the computing platform to:
update a request queue to include the event processing request and an indication of the identified one or more documents; and
update a response queue to include the obtained document images.

12. A method comprising:
at a computing platform comprising at least one processor, a communication interface, and memory:
synchronizing, using one or more edge nodes of the computing platform and with a physical repository server, a soft document repository, wherein the physical repository server stores document images, and wherein the soft document repository stores links to the document images;
identifying, based on an event processing request received from a digital identity in a metaverse environment and using a machine learning model, one or more documents needed to execute the event processing request;
accessing, using an edge node of the one or more edge nodes and via the soft document repository, the physical repository server to obtain document images corresponding to the identified one or more documents, wherein the edge node is closer in proximity to a user corresponding to the digital identity than the remaining one or more edge nodes; and
sending, to an enterprise user device, a haptic alert indicating that the event processing request is ready for processing and one or more commands directing the enterprise user device to produce a haptic response based on the haptic alert, wherein sending the one or more commands directing the enterprise user device to produce the haptic response cause the enterprise user device to produce the haptic response.

13. The method of claim 12, wherein the computing platform is configured to create the digital identity based on registration information received from the user.

14. The method of claim 12, wherein creating the digital identity comprises creating, at a first node of the one or more edge nodes, the digital identity, and wherein the digital identity is granted access to the soft document repository via at least one other node of the one or more edge nodes, different than the first node.

15. The method of claim 12, wherein the event processing request is received via a metaverse application interface, and wherein the metaverse application interface comprises an interactive touch surface within the metaverse environment.

16. The method of claim 12, further comprising:
training, using historical event processing requests and corresponding documentation information, the machine learning model, wherein training the machine learning model configures the machine learning model to output the one or more documents needed to execute the event processing request.

17. The method of claim 12, wherein the haptic alert comprises a notification that the identified one or more documents are available from a system of record.

18. The method of claim 17, wherein the one or more documents are sent from the physical repository server to the system of record based on one or more commands from the computing platform directing the physical repository server to transfer the one or more documents to the system of record.

19. The method of claim 12, further comprising
automatically processing the requested event based on verification of the obtained document images, wherein automatically processing the requested event comprises sending one or more event processing commands to an event processing system directing the event processing system to process the requested event, wherein sending the one or more event processing commands to the event processing system causes the event processing system to process the requested event.

20. One or more non-transitory computer-readable media storing instructions that, when executed by a computing platform comprising at least one processor, a communication interface, and memory, cause the computing platform to:

synchronize, using one or more edge nodes of the computing platform and with a physical repository server, a soft document repository, wherein the physical repository server stores document images, and wherein the soft document repository stores links to the document images;

identify, based on an event processing request received from a digital identity in a metaverse environment and using a machine learning model, one or more documents needed to execute the event processing request;

access, using an edge node of the one or more edge nodes and via the soft document repository, the physical repository server to obtain document images corresponding to the identified one or more documents, wherein the edge node is closer in proximity to a user corresponding to the digital identity than the remaining one or more edge nodes; and send, to an enterprise user device, a haptic alert indicating that the event processing request is ready for processing and one or more commands directing the enterprise user device to produce a haptic response based on the haptic alert, wherein sending the one or more commands directing the enterprise user device to produce the haptic response cause the enterprise user device to produce the haptic response.

* * * * *